(12) United States Patent
Napieralski et al.

(10) Patent No.: US 10,266,183 B1
(45) Date of Patent: Apr. 23, 2019

(54) BEAM TROLLEYS WITH WIDTH ADJUSTMENT SYSTEM AND RELATED METHODS

(71) Applicant: OZ Lifting Products, LLC, Winona, MN (US)

(72) Inventors: Steve Napieralski, Winona, MN (US); Gregory Lucas, La Crescent, MN (US)

(73) Assignee: OZ Lifting Products, LLC, Winona, MN (US)

( * ) Notice: Subject to any disclaimer, the term of this patent is extended or adjusted under 35 U.S.C. 154(b) by 301 days.

(21) Appl. No.: 15/261,649

(22) Filed: Sep. 9, 2016

Related U.S. Application Data

(60) Provisional application No. 62/292,252, filed on Feb. 6, 2016.

(51) Int. Cl.
  *B61B 3/00* (2006.01)
  *B65G 9/00* (2006.01)
  *B66C 11/06* (2006.01)

(52) U.S. Cl.
  CPC ............... *B61B 3/00* (2013.01); *B65G 9/002* (2013.01); *B66C 11/06* (2013.01)

(58) Field of Classification Search
  CPC ..... B66C 9/06; B66C 11/06; B66C 2700/014; B61B 3/00; B65G 9/002
  USPC ....................................................... 105/154
  See application file for complete search history.

(56) References Cited

U.S. PATENT DOCUMENTS

| | | | | |
|---|---|---|---|---|
| 1,151,226 A | * | 8/1915 | Steedman | B66C 11/06 105/154 |
| 1,646,217 A | * | 10/1927 | Richter | B65G 9/002 105/154 |
| 2,470,060 A | * | 5/1949 | Webb | B60L 3/00 105/152 |
| 2,744,472 A | * | 5/1956 | Symons | E04G 3/28 105/154 |
| 4,343,240 A | * | 8/1982 | Nishimura | F16B 21/12 105/54 |
| 4,569,290 A | * | 2/1986 | Hecht | E01B 29/20 105/154 |
| 5,623,879 A | * | 4/1997 | Gersemsky | B61B 3/02 104/93 |

(Continued)

OTHER PUBLICATIONS

2 Ton Push Beam Trolley, sold/published online by Harbor Freight Tools at least as early as Feb. 4, 2016, available online at http://www.harborfreight.com/2-ton-capacity-plain-trolley-40493.html, last visited May 27, 2016.

(Continued)

*Primary Examiner* — Zachary L Kuhfuss
(74) *Attorney, Agent, or Firm* — IPTechLaw

(57) ABSTRACT

A beam trolley having a width adjustment system includes a first side plate having two or more wheels configured to couple with a beam (which may have an I-beam, wide flange (W-type) I-beam, or standard (S-type) I-beam configuration). A second side plate having two or more wheels coupled thereon is configured to couple with the beam. A main load bar couples with the first and second side plates and includes a threaded shaft having a first alignment surface. A threaded hand wheel couples with the threaded shaft and is configured to move the threaded shaft relative to the first and/or second side plate(s) in response to manual rotation of the threaded hand wheel to adjust a distance between the first and second side plates. An aligner couples with one of the side plates and includes a surface engaging the first alignment surface to prevent rotation of the main load bar.

18 Claims, 6 Drawing Sheets

(56) References Cited

U.S. PATENT DOCUMENTS

| | | | | |
|---|---|---|---|---|
| 5,664,502 | A | * | 9/1997 | Wilhelm .................. B66C 9/12 104/95 |
| 5,809,896 | A | * | 9/1998 | Gersemsky ............... B66C 7/02 104/107 |
| 6,220,176 | B1 | * | 4/2001 | Gersemsky ............... B61B 3/00 105/141 |
| 6,516,728 | B1 | * | 2/2003 | Muller .................... B61B 13/04 104/137 |
| 7,739,960 | B2 | * | 6/2010 | Moll ....................... B61B 13/04 104/89 |
| 8,453,802 | B1 | * | 6/2013 | Simpson .................. B60T 1/14 105/148 |
| 8,783,189 | B2 | * | 7/2014 | Gouault .................. B61B 13/04 104/95 |
| 9,663,331 | B2 | * | 5/2017 | Buhlmayer ............. B61B 13/04 |

OTHER PUBLICATIONS

500kg Adjustable Push Travel Beam Trolley (50-220mm), sold/published online by Premier Lifting & Safety at least as early as Feb. 4, 2016, available online at http://www.premierlifting.com/catalogue/lifting-accessories/beam-trolley/500kg-adjustable-push-travel-beam-trolley-50-220mm-BT05, specification sheet available online at http://www.premierlifting.com/files//d05b6450-f289-4204-902a-9d3a008b7deb/beam%20clamps%20and%20trolleys.pdf, both last visited May 27, 2016.

Beam Trolley with Clamp, sold/published online by OZ Lifting Products at least as early as Feb. 4, 2016, available online at http://www.ozliftingproducts.com/products/beam-trolley-with-clamp/, last visited May 27, 2016.

Geared Beam Trolley, sold/published online by OZ Lifting Products at least as early as Feb. 4, 2016, available online at http://www.ozliftingproducts.com/products/geared-beam-trolley/, last visited May 27, 2016.

Hand Retractable Plungers, sold/published online by Carlane.com at least as early as Feb. 4, 2016, available online at https://www.carrlane.com/catalog/index.cfm/27825071F0B221118070C1C513E111D081B0006280B1713050245221E0107070F1A3C3B2853514A5A, last visited May 27, 2016.

* cited by examiner

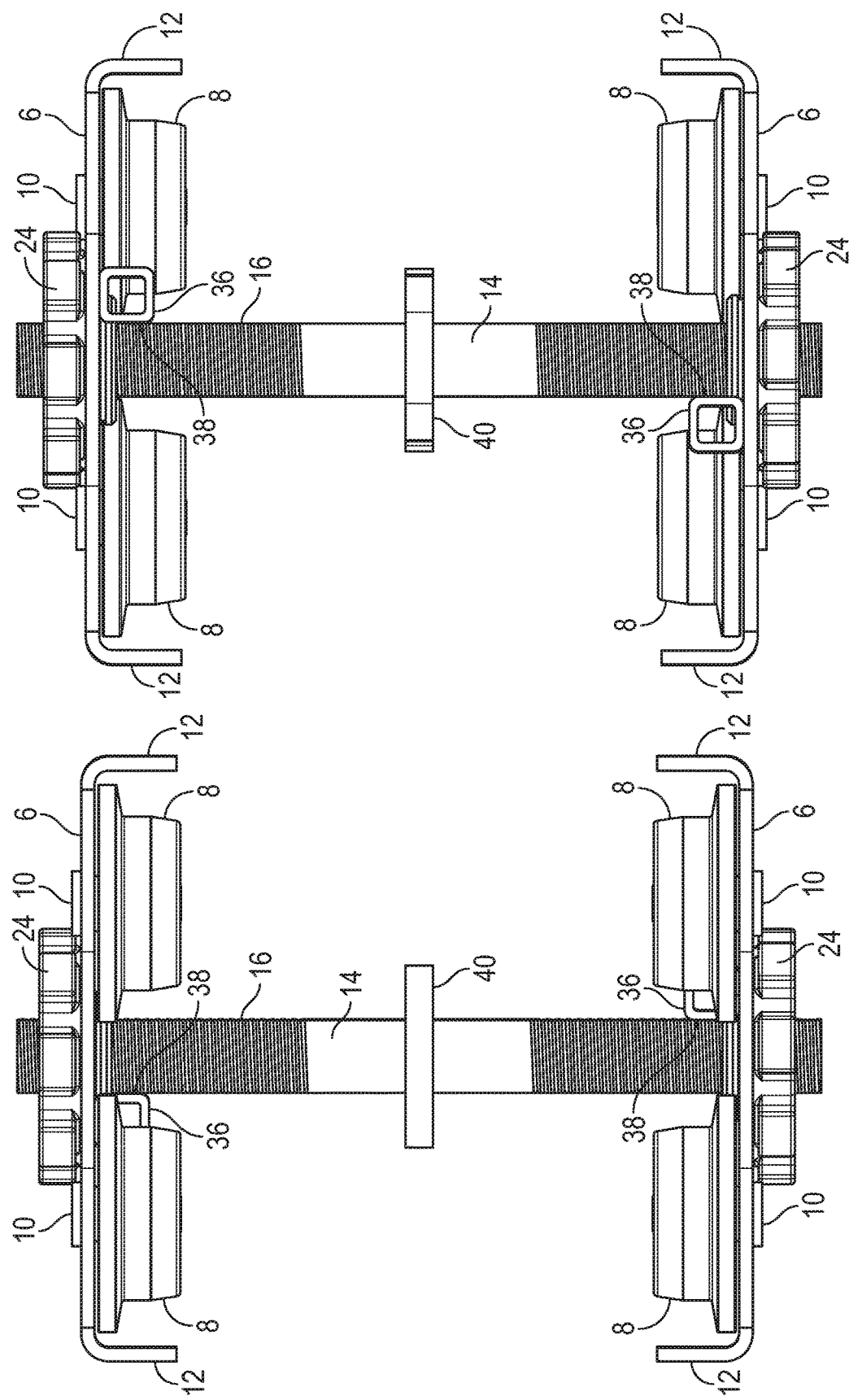

BEAM TROLLEYS WITH WIDTH ADJUSTMENT SYSTEM AND RELATED METHODS

CROSS REFERENCE TO RELATED APPLICATIONS

This document claims the benefit of the filing date of U.S. Provisional Patent Application 62/292,252, entitled "Beam Trolleys with Width Adjustment Systems and Related Methods," listing as first inventor Steve Napieralski, which was filed on Feb. 6, 2016, the disclosure of which is hereby incorporated entirely herein by reference.

BACKGROUND

1. Technical Field

Aspects of this document relate generally to beam trolleys. Specific implementations involve beam trolleys with width adjustment systems.

2. Background

Conventional beam trolleys are used to couple loads with a beam, such as an I-beam (including W-type or wide flange I-beams and S-type or standard I-beams), to enable movement of the load by rolling the beam trolley on the beam. Some conventional beam trolleys are geared to allow a user to move the beam trolley along a beam such as through the use of a chain or other element coupled with one or more gears.

SUMMARY

Implementations of beam trolleys with width adjustment systems may include: a first side plate having two or more wheels coupled thereon configured to couple with a beam; a second side plate having two or more wheels coupled thereon configured to couple with the beam; a main load bar coupled with the first side plate and the second side plate and including a threaded shaft having a first alignment surface; a threaded hand wheel coupled with the threaded shaft and configured to move the threaded shaft relative to the first side plate and/or the second side plate in response to manual rotation of the threaded hand wheel to adjust a distance between the first side plate and the second side plate, and; an aligner coupled with the first side plate and/or the second side plate, the aligner including a surface engaging the first alignment surface and configured to prevent rotation of the main load bar.

Implementations of beam trolleys with width adjustment systems may include one, all, or any of the following:

The first alignment surface may include a flat portion.

The surface of the aligner may include a flat surface.

The first alignment surface may extend along a majority of a longest length of the threaded shaft.

A second threaded hand wheel may be coupled with the threaded shaft and configured to move the threaded shaft relative to the first side plate and/or the second side plate in response to manual rotation of the second threaded hand wheel to adjust the distance between the first side plate and the second side plate.

The threaded shaft may include a second alignment surface and a second aligner may be coupled with the first side plate and/or the second side plate. The second aligner may include a surface engaging the second alignment surface and configured to prevent rotation of the main load bar.

The threaded shaft may include a flat portion recessed from the first alignment surface.

The beam trolley may include a locking mechanism that may be configured to prevent rotation of the threaded hand wheel.

A load bail may be coupled with the threaded shaft.

The threaded shaft may include one or more center holes configured to receive one or more centering elements to keep a load bail in a centered position relative to the threaded shaft.

The beam trolley may be configured to allow each of the side plates to independently move relative to a center of the main load bar without the other side plate moving relative to the center of the main load bar while the beam trolley is secured to the beam.

The beam trolley may be configured to allow each of the side plates to move relative to one another without rotating the threaded shaft while the beam trolley is secured to the beam.

Implementations of beam trolleys with width adjustment systems may include: a first side plate having two or more wheels coupled thereon configured to couple with a beam; a second side plate having two or more wheels coupled thereon configured to couple with the beam; a main load bar coupled with the first side plate and the second side plate and including a threaded shaft having a first flat portion; a first threaded hand wheel coupled with the threaded shaft and configured to move the threaded shaft relative to the first side plate and/or the second side plate in response to manual rotation of the first threaded hand wheel to adjust a distance between the first side plate and the second side plate; a locking mechanism coupled with the first threaded hand wheel and configured to prevent rotation of the first threaded hand wheel in an engaged configuration and to allow rotation of the first threaded hand wheel in a disengaged configuration, and; an aligner coupled with the first side plate and/or the second side plate, the aligner including a flat surface engaging the first flat portion and configured to prevent rotation of the main load bar.

Implementations of beam trolleys with width adjustment systems may include one, all, or any of the following:

A second threaded hand wheel may be coupled with the threaded shaft and configured to move the threaded shaft relative to the first side plate and/or the second side plate in response to manual rotation of the second threaded hand wheel to adjust the distance between the first side plate and the second side plate.

The first flat portion may extend along a majority of a longest length of the threaded shaft.

The threaded shaft may include a second flat portion and the beam trolley may include a second aligner having a second flat surface engaging the second flat portion and configured to prevent rotation of the main load bar.

The locking mechanism may include a locking pin coupled into the first threaded hand wheel and one or more pin holes in the first side plate may be configured to receive the locking pin.

The locking mechanism may include a ratcheting mechanism including one or more pawls configured to engage with one or more gear teeth coupled with the first threaded hand wheel.

Implementations of beam trolleys with width adjustment systems may include: a first side plate having two or more wheels coupled thereon configured to couple with a beam; a second side plate having two or more wheels coupled thereon configured to couple with the beam; a main load bar coupled with the first side plate and the second side plate and including a threaded shaft having a first flat portion and a second flat portion; a first threaded hand wheel coupled with the threaded shaft and configured to move the threaded shaft relative to the first side plate in response to manual rotation of the first threaded hand wheel to adjust a distance between the first side plate and the second side plate; a second threaded hand wheel coupled with the threaded shaft and configured to move the threaded shaft relative to the second side plate in response to manual rotation of the second threaded hand wheel to adjust the distance between the first side plate and the second side plate; a locking pin coupled with, and configured to prevent rotation of, one of the threaded hand wheels; a first aligner coupled with the first side plate, the first aligner including a flat surface engaging the first flat portion of the threaded shaft and configured to prevent rotation of the main load bar, and; a second aligner coupled with the second side plate, the second aligner having a flat surface engaging the second flat portion of the threaded shaft and configured to prevent rotation of the main load bar.

Implementations of beam trolleys with width adjustment systems may include one, all, or any of the following:

The locking pin may be configured to prevent rotation of one of the threaded hand wheels when the locking pin is engaged with a pin hole in one of the side plates and the locking pin may be configured to allow rotation of one of the threaded hand wheels when the locking pin is not engaged with the pin hole.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and:

FIG. 4 is a top view of the beam trolley of FIG. 1;

FIG. 5 is a bottom view of the beam trolley of FIG. 1;

DESCRIPTION

This disclosure, its aspects and implementations, are not limited to the specific components, assembly procedures or method elements disclosed herein. Many additional components, assembly procedures and/or method elements known in the art consistent with the intended beam trolleys with width adjustment systems and related methods will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such beam trolleys with width adjustment systems and related methods, and implementing components and methods, consistent with the intended operation and methods.

The terms "beam" and "I-beam," as used herein, are each defined as a load bearing element having a cross section generally in the shape of an I (or an H when turned on its side), with a vertical portion and two horizontal portions, each horizontal portion located at an end of the vertical portion. The horizontal portions are generally called "flanges" while the vertical portion is generally called the "web" of the beam. The terms "beam" and "I-beams" as used herein include W-type or wide flange I-beams, S-type or standard I-beams, H-beams, Universal Beams (UBs), Rolled Steel Joists (RSJs), and double-T beams.

Figure 6:
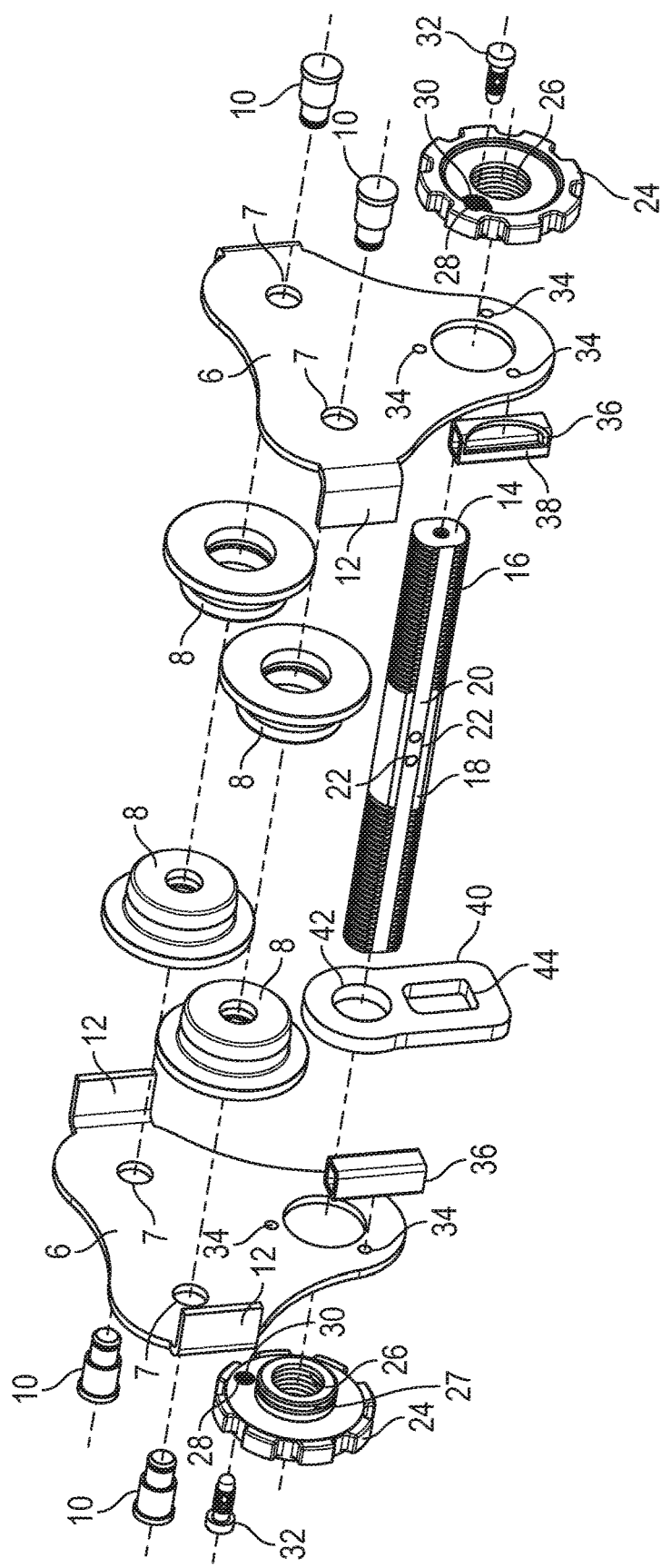
FIG. 6 is an exploded view of the beam trolley of FIG. 1 and including an additional locking pin element.

Referring now to FIGS. 1-6, an implementation of a beam trolley (trolley) 2 having a width adjustment system (system) 4 is shown. FIGS. 1-6 show different views of the trolley, with FIG. 6 showing an exploded view. For ease of viewing other elements, the locking pin (pin) 32, which will be described hereafter, is only shown in FIG. 6, though it is a component of the implementation shown in FIGS. 1-5 as well.

The beam trolley includes two side plates 6 and each side plate has two axle holes 7 for receiving axles 10 about which wheels 8 rotate. The wheels are sized and spaced so that they may ride on a portion of a beam, such as an I-beam (or any of the other beam types described herein). In some implementations more than two wheels could be used per side plate—for example three wheels, four wheels, or more. This could be done, for example, to have more load-bearing locations on the beam and/or to distribute the load of the beam trolley among more than the four wheels shown in the drawings. Or, in other implementations, fewer than two wheels could be used, such as one wheel per side plate, but using at least two wheels provides stability of the beam trolley so that it does not rotate relative to the beam but only translates linearly along the beam using the wheels, and provides additional distribution of the load of the beam trolley among more wheels.

The beam trolley is configured so the wheels rest on an upper side of a lower portion of an I-beam—in other words, the wheels rest on the top of the lower flange. For example, for an I-beam that has one vertical section (the web) and two horizontal sections (the flanges—one on top and one on bottom of the web), the wheels rest on the top of the lower flange on both sides of the web, riding along the lower flange when the wheels rotate (such as by a user pulling the beam trolley in one direction or the other). The wheels may be designed so that they are not angled, and are configured to ride on a flat flange. Some flanges (such as in S-type beams) have a bit of curvature or angle to them so that the riding surface is not necessarily perfectly perpendicular to the web portion of the beam. In such cases the wheels may be angled inwards a bit so that the wheels ride squarely on the flange, or in other implementations the wheels may be configured to have some freedom of movement relative to the side plate so that an angle of each wheel relative to the side plate can vary to allow the wheel to ride squarely on the flange.

The trolleys shown in the drawings are seen to have side members 12 which can protect the wheels and the axles. If the beam trolley collides with another beam trolley or some other item while riding on the beam, the side members may prevent the axles from being bent and may otherwise protect the wheels and axles so that the collision does not affect ease of movement of the trolley along the beam.

The beam trolleys shown in the drawings do not have automated or geared mechanisms for moving the wheels. Accordingly, these beam trolleys could be translated along a beam simply by a user pulling the load hanging from the beam trolley in one direction or the other. In other implementations a gear mechanism could be used, such as a chain coupled with one or more of the wheels so that, when a user pulls down on one side of the chain, the wheels are rotated so that the beam trolley moves in a first direction, and when the user pulls down on the other side of the chain the wheels are rotated so that the beam trolley moves in a second direction opposite the first direction. Such a mechanism may use gear reduction to make the chain pulling easier for a user. Other implementations could have motorized mechanisms so that a controller wired with a motor (or wirelessly communicating therewith) may be operated by a user to rotate the wheels using the motor to thereby move the trolley in one direction or the other.

The beam trolley is used to carry a load along a beam and/or to lift a load upwardly toward the beam. It may be seen from the figures that each side plate is coupled with a main load bar 14 and that a load bail 40 hangs from the main load bar. A load, which could be any item that needs to be moved from one location to another, is coupled with the load bail, such as with the use of a chain, a hoist, or any other coupling element. The coupling mechanism could include a mechanical or electrical hoist that uses mechanical gear reduction and/or electrical power to help lift and lower a load. The hoist would hang from the load bail and would in turn be used to lift a load off of the ground or some other location so that the load is freely hanging from the load bail. Once the load is lifted off the ground or other surface, the beam trolley may be used to move the load, by rolling the trolley along the beam as described previously, to some other location. Once at the second location the load may then be lowered and released from the hoist and/or the load bail. The beam trolley may then be moved to another location along the beam to perform some other moving operation. In this way the beam trolley is used to repeatedly carry loads to varying locations along a beam. While the beams may be straight, in implementations some beams may be curved and/or connected with other beams in a network so that the load may be moved along a path that is not necessarily a straight line to get to a second location.

Figure 1:
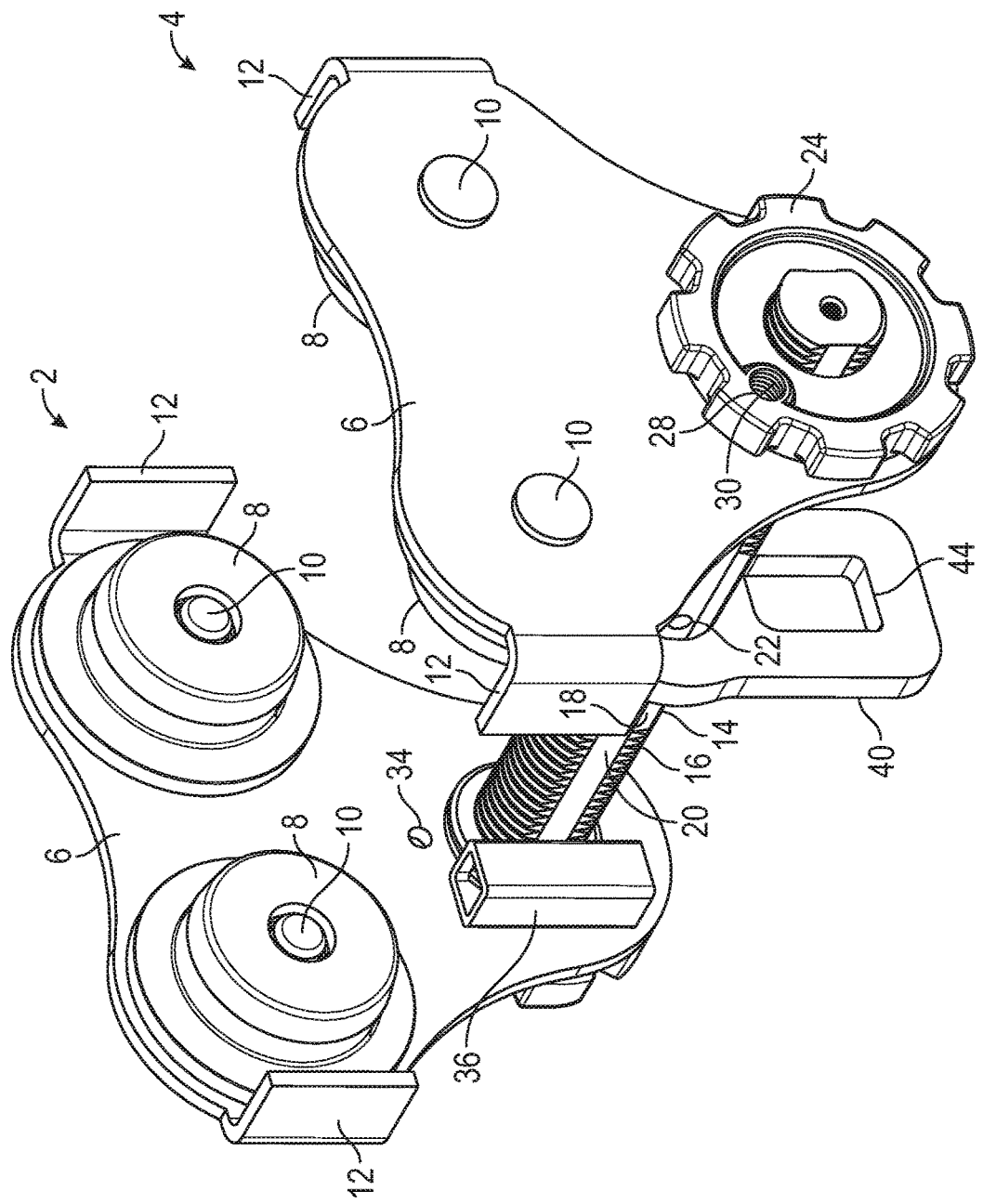
FIG. 1 is a perspective view of an implementation of a beam trolley having a width adjustment system.
Figure 2:
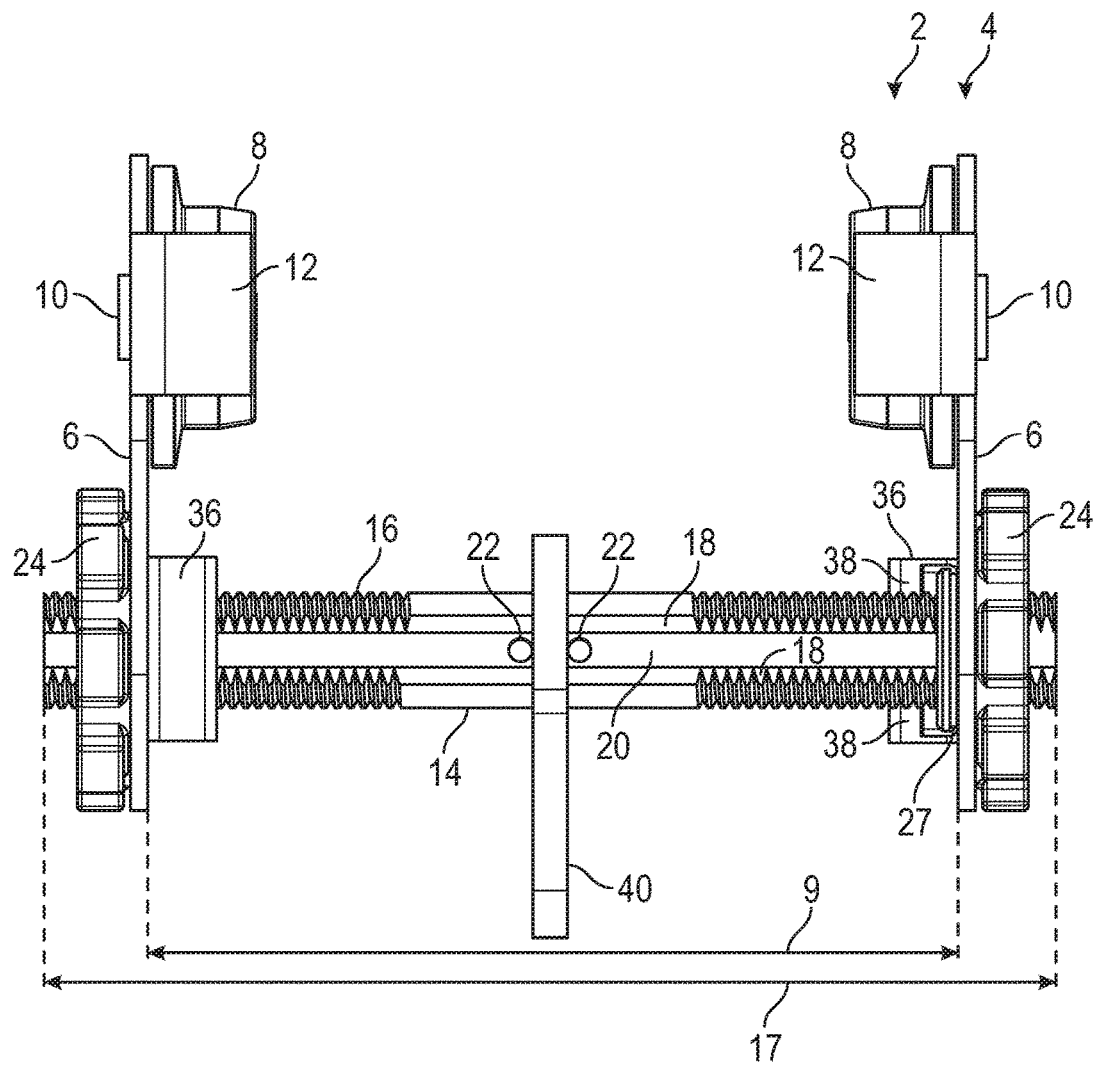
FIG. 2 is front view of the beam trolley of FIG. 1.

FIGS. 1, 2 and 6 show that the main load bar includes center holes 22 and that the load bail includes a load bar opening 42 and a load receiver 44. The main load bar slides inside the load bar opening and the load receiver receives the load, such as with a chain, rope, hoist, or the like as described above. The load receiver is shown to be an opening completely contained within the load bail. In other implementations, though, the opening could be only partially contained within the load bail—for instance the load bail could have the shape of a hook, a "J," or the like, and the curve or hook element could be used to hold the load. Using an enclosed opening, however, may reduce the likelihood that the load comes off of the load bail during operation and/or may reduce the likelihood of load bail deformation or fracture, which may reduce the likelihood of user injury and load damage (or damage to other items).

The center holes may be used to ensure that the load bail, which otherwise slides freely along the main load bar, stays centered thereon. One or more pins, or even some item threaded through both of the center holes such as a metallic braided wire, a metallic u-shaped element, or the like (formed of metal, polymer, ceramic, composite, or some other material), could be used to prevent the load bail from moving relative to the main load bar, so that it stays centered thereon. Keeping the load centered on the main load bar ensures generally equal distribution of the load among the side plates and wheels, which may help the beam trolley to move with sufficient ease along the beam and may increase the life and/or reduce the wear of wheels, axles, and other components of the trolley. Nevertheless, the trolley will still operate if the force of the load is not centered on the main load bar.

The width adjustment system of the beam trolley includes one or more mechanisms used to adjust a distance 9 between the side plates. Adjusting the distance between side plates also adjusts the distance between wheels and other elements of the beam trolley. The width adjustment system may be used to alter the fit of the beam trolley on differently-sized beams. It may also be used to remove the beam trolley from a beam and/or to place the beam trolley on the beam to begin with. When the distance between plates/wheels has been adjusted to be greater than some predetermined amount the beam trolley may be removed from the beam (or placed thereon to begin with). When the distance between plates/wheels is decreased so that the wheels rest on the top of the lower horizontal portion of the I-beam, as described above, the trolley stays secured to the beam so that it may roll from side to side along the beam without becoming decoupled from the beam. This of course keeps a lifted load from falling relative to the beam until a user intentionally lowers the load.

In implementations the main load bar includes a threaded shaft 16. Threads of the threaded shaft are seen in several of the drawings and are shown to not extend, generally, into a central portion of the main load bar where the load bail hangs. In other implementations the threads could exist along the full length of the threaded shaft or further along the shaft than is shown in the drawings, such as for bringing the side plates even closer together. The threaded shaft has a longest length 17 shown in FIG. 2, and the distance 9 between side plates and longest length 17 is parallel.

There are threaded hand wheels (hand wheels) 24 coupled with the threaded shaft at an outer surface, or proximate an outer surface, of each side plate. Each threaded hand wheel has internal threads 26, so that when the threaded hand wheel is rotated, the hand wheel moves linearly in a direction collinear with the longest length of the threaded shaft. Rotating the hand wheel in one rotational direction will thus move the hand wheel closer to the center of the threaded shaft, and rotating the hand wheel in the other rotational direction will move the hand wheel farther from the center of the threaded shaft. Rotating a hand wheel so that it moves closer towards the center of the threaded shaft causes the side plate next to it to also move closer towards the center of the threaded shaft (and thus closer towards the other side plate), while rotating the hand wheel in the opposite rotation causes the side plate to move away from the center of the threaded shaft (and thus away from the other side plate).

In the implementations shown in the drawings a portion of each hand wheel passes through a circular opening in a side plate, as may be envisioned from FIG. 6, so that a groove 27 of the hand wheels passes through the circular opening. A locking ring or clip may be coupled in the groove, the locking ring or clip having a diameter greater than the opening in the side plate, so that the hand wheel and side plate are prevented from moving laterally relative to one another (i.e., along a direction parallel with the longest length of the threaded shaft), but the hand wheel is still free to rotate relative to the side plate along a direction orthogonal to the longest length of the threaded shaft. The locking ring or clip ensures that, when the hand wheel is rotated in a direction distancing the hand wheel from the center of the threaded shaft, the side plate is correspondingly pulled away from the center of the threaded shaft, and that when the wheel is rotated in a direction so that the wheel approaches the center of the threaded shaft the side plate is also brought closer to the center of the threaded shaft.

Although the implementations shown in the drawings include two hand wheels, in other implementations beam trolleys could include only one hand wheel. One advantage, however, of having a hand wheel associated with each side plate, is the ability to move both side plates relative to the threaded wheel simultaneously while the beam trolley is coupled with a beam. This may allow faster adjustment of the distance between the side plates. Another advantage of having a hand wheel associated with each side plate is the ability to move each side plate independently, relative to the threaded shaft, while the beam trolley is coupled with a beam. For instance, a user could distance one side plate from the center of the shaft without changing a distance between the center of the shaft and the other side plate. Or one could move one side plate farther from the center of the shaft and the other side plate closer to the center of the shaft. Other options are possible, and these are only given as representative examples of the flexibility in adjustment of the side plates effectuated by independent movement of each side plate relative to the threaded shaft.

If, for example, it were discovered that the load bail, although centered on the threaded shaft, was not centered between the side plates due to one side plate being closer to the center of the threaded shaft than the other, the ability to move one side plate independent of the other will allow a user to adjust the beam trolley back to a centered configuration, so that the side plates are equidistant (or substantially equidistant) from the center of the threaded shaft (and thus from the load bail), without having to remove the beam trolley from the beam. If, on other hand, the side plates were not able to be adjusted independent of one another, the user may have to remove the beam trolley from the beam in order to adjust the side plates so that they are in a centered configuration equidistant from the load bail (this would of course also entail removing any load). Naturally, not only may the side plates be independently adjusted in this manner while the beam trolley is coupled with a beam, but also while the beam trolley is carrying a load coupled with the load bail. Thus, the distance between the side plates may be adjusted, independent of one another, without removing any load, hoist, chain, etc., coupled with the load bail. This allows a tightening or loosening of the beam trolley on the beam without having to remove the load or hoist/chain elements coupled with the load bail, which allows for more quick and efficient movement of loads while making in-situ trolley adjustments as needed.

The load bar opening of the load bail could be configured so that the load bail is freely rotatable about the threaded shaft. This could be useful, for example, if the beam trolley is on a beam that has some slight incline. In such a scenario the freely rotatable nature of the load bail would allow the load bail to rotate so that it remains fixed relative to the load vector acting on it from the load, regardless of the incline or decline of the I-beam upon which the trolley is riding. This may allow for proper distribution of the load force from the load bail to the main load bar by a downward force on the load bar without a torque on the load bar, which may decrease wear and/or increase the longevity of the load bar and other elements of the beam trolley.

FIG. 1 shows that each hand wheel has a hole (pin receiver) 28 with internal threads 30 therein. These are used for an implementation of a locking mechanism which locks the hand wheel relative to the side plate (and accordingly locks that side plate relative to the center of the threaded shaft while the beam trolley is coupled with a beam). The side plates in the various drawings may be seen to have pin holes 34 for receiving a locking pin. The side plates in the drawings are seen to each have three pin holes, spaced equally distant from one another around the opening through which the threaded shaft passes. Thus, in the implementation shown, the pin holes are 120 degrees apart. A user could accordingly unlock the hand wheel by pulling the locking pin free from one of the pin holes, rotate the hand wheel 120 degrees, and there lock the hand wheel in place again using the locking pin and another of the pin holes.

Of course, having three pin holes in each side plate is only one representative example among many. There could be only one pin hole, two pin holes, four pin holes, five pin holes, and so on, including any number of pin holes, so that the user could lock the hand wheel in place after turning it fewer or greater than 120 degrees.

The locking pin is not shown in FIGS. 1-5, but FIG. 6 shows representative examples of locking pins 32 that may be used. The locking pins shown in FIG. 6 are biased with a spring towards the closed position or, in other words, towards being inserted through the pin holes 34. Thus, when a user desires to rotate a hand wheel, if it is in a locked configuration the user may pull the head of the locking pin, to overcome the bias and pull the pin out of the pin hole, and then rotate the hand wheel. In implementations the locking pin remains biased towards the pin holes (i.e., towards the side plate) while the hand wheel is rotating, so that the locking pin will insert itself in the next available pin hole, due to the bias, to again lock the hand wheel in place (and thus lock the side plate relative to the threaded hand wheel).

Other configurations are possible, however, and locking pins which are not biased towards the locked position, but which are manually placed in the locking position, may be used. In implementations a user could rotate the hand wheel using the locking pin itself, by holding the locking pin in the outward non-locked position and using it as a knob to rotate the hand wheel, until the hand wheel is about at the desired position, and then the user could release the locking pin so that the bias locks it into the next available pin hole as the rotation of the hand wheel continues. In other implementations, as is the case with the implementation illustrated in the drawings, the locking pin may be rotated after being pulled out of a pin hole to lock the locking pin in a retracted position, so that it is no longer biased towards the pin holes. The hand wheel may then be rotated freely as desired, and when the hand wheel is about at the desired position, the user may rotate the locking pin so that it is not locked in the retracted position but is again biased towards the pin holes, and the locking pin will then insert itself into the next available pin hole to lock the hand wheel in place. In the implementation illustrated, both hand wheels have associated locking pins, though in other implementations only one hand wheel could have a locking pin, or the locking mechanism could be excluded entirely. Having a locking mechanism may be useful, however, to ensure that the side plates stay at a desired distance from one another during use of the beam trolley despite jostling and movement of the various elements of the beam trolley.

In implementations the main load bar may be configured so that it does not rotate during use of the beam trolley or during rotation of the threaded hand wheels. This may be useful, for example, to avoid wear on the main load bar from the load bail and the associated load when the side plates are adjusted. It may also be useful to ensure that rotation of one hand wheel does not cause some residual rotation of the other hand wheel due to rotation of the threaded hand wheel (therefore ensuring that the side plates are truly independently moveable from one another, or that movement of one side plate relative to the threaded shaft causes no movement of the other side plate relative to the threaded shaft).

One representative example of preventing rotation of the threaded shaft is through the use of an aligner 36 which has a surface 38 which in the drawings is shown as a flat surface, though in other implementations it could be a non-flat surface having any shape configured to mate with an alignment surface of the threaded shaft so that rotation of the threaded shaft is prevented, although lateral movement of the threaded shaft is allowed (along a direction collinear with the longest length of the shaft).

There could be only one aligner and one alignment surface of the threaded shaft in some implementations. The version in the drawings includes two aligners, one coupled with each side plate, to be used with opposite alignment surfaces of the threaded shaft. Thus one aligner 36 has a surface that interacts (engages or abuts) with the first alignment surface 18, and the other aligner 36 has a surface that interacts (engages or abuts) with the second alignment surface 19. The surfaces of the aligners and the first and second alignment surfaces of the threaded shaft are shown in the drawings to all be flat portions, but in other implementations they could be non-flat portions having any shape so that the surfaces of the aligners mate with the surfaces of the threaded shaft to prevent rotation of the threaded shaft along its axis while still allowing lateral movement of the threaded shaft along a direction collinear with the longest length of the shaft.

The aligners are seen in the drawings to have the shape of hollow rectangular tubes having a portion removed for the portion of the hand wheel that extends through an opening in the side plate. Other configurations and shapes are possible for the aligners. The first and second alignment surfaces of the threaded shaft shown in the drawings are seen to include flat portions of the threads of the threaded shaft where the threads exist, and a flat strip or semi-rectangular portion where the threads do not exist.

Figure 3:
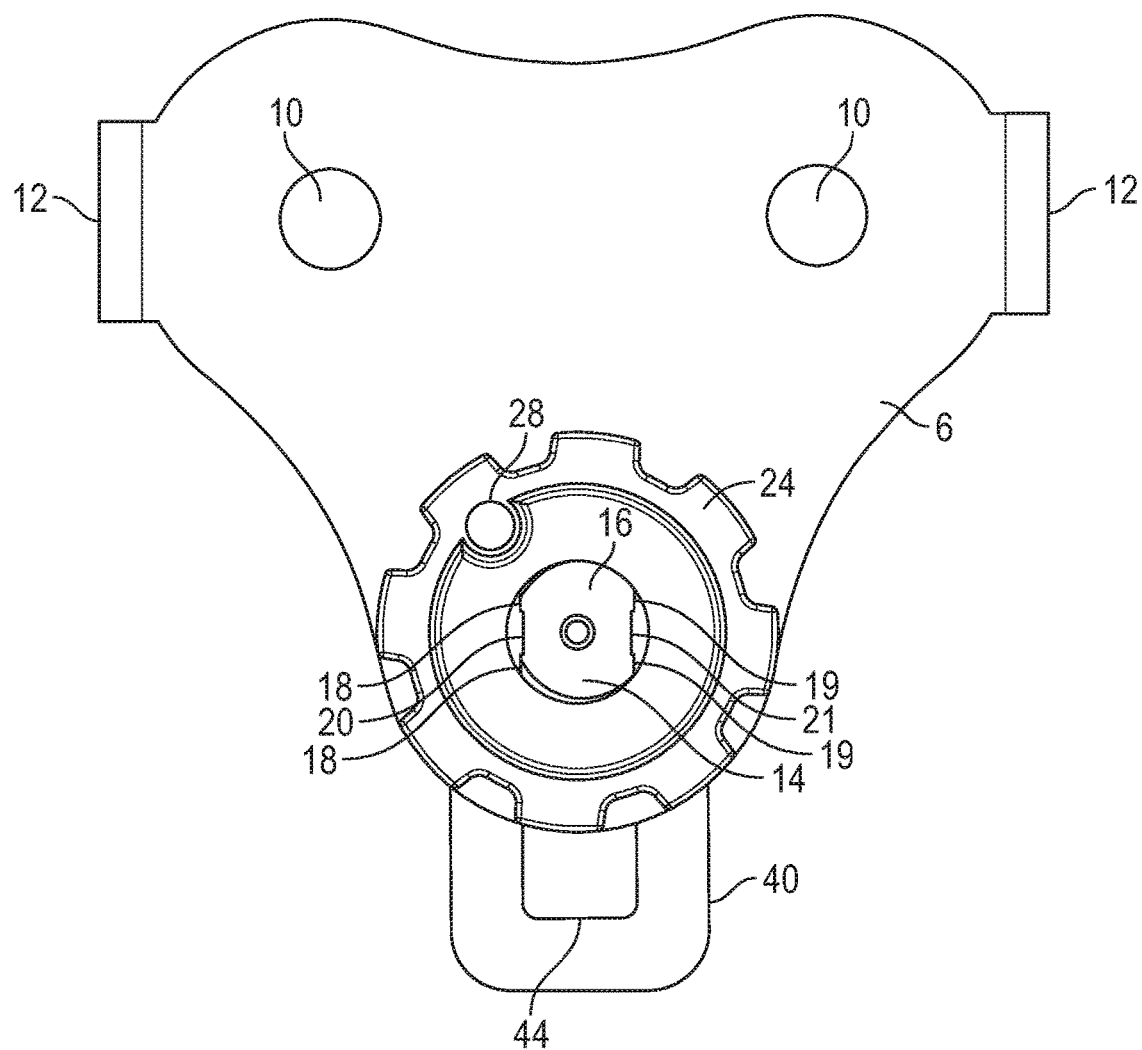
FIG. 3 is a right side view of the beam trolley of FIG. 1.

One or more additional alignment surfaces may be included in the threaded shaft. FIGS. 3 and 6 show that the threaded shaft includes a third alignment surface 20, which in the implementation shown is a flat portion recessed in from the first alignment surface 18, and a fourth alignment surface 21, which in the implementation shown is a flat portion recessed in from the second alignment surface 19. These recessed surfaces may be used, by non-limiting example, for the placement of one or more measurement decals, stickers, inscriptions, engravings, markings, or the like. These may be used, for example, to assist a user in assessing the distance of each side plate from a center of the threaded shaft, to ensure a centered configuration for the side plates. Such markings could be placed on a location of the shaft other than a recessed portion (and the recessed portions could therefore be excluded), but the placement of the measurement element in a portion of the threaded shaft that is recessed from the first and second alignment surfaces may ensure that the measurement markings, decals, or the like, are not damaged, smudged, worn, etc., when the first and second alignment surfaces slide against the aligners. In implementations only one measurement decal, sticker, marking, etc., may be used, so that either the third or fourth alignment surface could be excluded.

In the drawings it is seen that the first alignment surface, second alignment surface, third alignment surface, and fourth alignment surface each extends along the full longest length 17 of the threaded shaft. In other implementations each could extend along only a majority of the longest length 17 but not along the entirety of the longest length. Each could also extend along only less than a majority of the longest length 17. Having the first and second alignment surfaces extend along a majority (or along the full length) of the longest length 17, however, may facilitate non-rotation of the threaded shaft even when the side plates are brought very close together (and/or it may facilitate their being brought very close together). Having the third and/or fourth alignment surfaces extend along a majority (or along the full length) of the longest length 17 may allow for measurement of a distance of each side plate relative to the center of the threaded shaft at distances near to, and at distances far from, the center.

Figure 7:
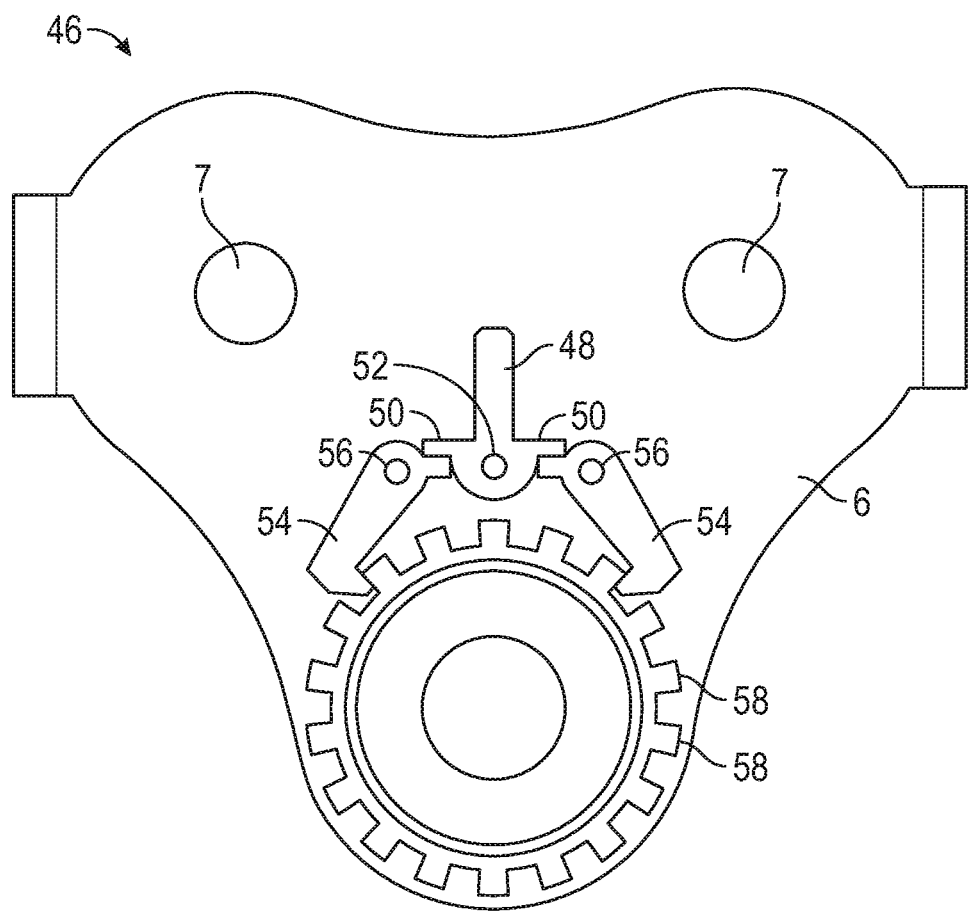
FIG. 7 is a side view of a side panel of a beam trolley having a locking mechanism which uses a ratcheting mechanism.

FIG. 7 shows a side plate having a locking mechanism different from the pin and pin hole mechanism that was described previously. A ratcheting mechanism 46 is used, which includes a lever 48 interacting with two pawls 54 that in turn interact with gear teeth 58 coupled with the threaded hand wheel (the threaded hand wheel is not shown for ease of viewing the other elements). In implementations the gear teeth could be part of the threaded hand wheel itself, and in other implementations the gear teeth could be formed of one or more separate elements coupled with the hand wheel. In either case the threaded hand wheel and gear teeth are not free to rotate relative to one another-so that rotating one rotates the other and so that preventing one from rotating also prevents the other from rotating. The lever in the configuration shown in FIG. 7 is in a locked configuration so that the pawls are both engaging the gear teeth and the threaded hand wheel cannot be rotated in either direction.

As the reader may envision, if the lever 48 is rotated clockwise about its axle 52 so that the rightmost engager 50 causes the rightmost pawl 54 to rotate counter-clockwise about its axle 56, the rightmost pawl will disengage the gear teeth and the threaded hand wheel will be able to be rotated in the clockwise direction only, due to the tapered surface of the portion of the leftmost pawl that engages with the gear teeth. Rotation of the threaded hand wheel in the counter-clockwise direction would be prevented due to the non-tapered surface of the pawl.

If, on the other hand, the lever 48 is rotated counter-clockwise about its axle 52 so that the leftmost engager 50 causes the leftmost pawl 54 to rotate clockwise about its axle 56, the leftmost pawl will disengage the gear teeth and the threaded hand wheel will be able to be rotated in the counter-clockwise direction only, due to the tapered surface of the portion of the rightmost pawl that engages with the gear teeth. Rotation of the threaded hand wheel in the clockwise direction would be prevented due to the non-tapered surface of the pawl.

Thus, FIG. 7 shows a version of a locking mechanism using ratcheting elements, instead of the locking pin mechanism described previously. Other locking mechanisms may also be possible in other beam trolley implementations.

Any materials may be used for the various elements of the beam trolley. In implementations all of the elements may be formed of metals, such as steels. In implementations the threaded hand wheels could be formed of polymers. In implementations any of the elements, however, may be formed of metals, polymers, ceramics, composites, and the like, taking into account the load bearing nature of various elements, the desirable wear resistance of various elements, and so forth.

In places where the description above refers to particular implementations of beam trolleys with width adjustment systems and related methods and implementing components, sub-components, methods and sub-methods, it should be readily apparent that a number of modifications may be made without departing from the spirit thereof and that these implementations, implementing components, sub-components, methods and sub-methods may be applied to other beam trolleys with width adjustment systems and related methods.

What is claimed is:

1. A beam trolley having a width adjustment system, comprising:
   a first side plate having two or more wheels coupled thereon configured to couple with a beam;
   a second side plate having two or more wheels coupled thereon configured to couple with the beam;
   a main load bar coupled with the first side plate and the second side plate and comprising a threaded shaft having a first alignment surface;
   a threaded hand wheel coupled with the threaded shaft and configured to move the threaded shaft relative to one of the first side plate and the second side plate in response to manual rotation of the threaded hand wheel to adjust a distance between the first side plate and the second side plate, and;
   an aligner coupled with one of the first side plate and the second side plate, the aligner comprising a surface engaging the first alignment surface and configured to prevent rotation of the main load bar;
   wherein the first alignment surface extends along a majority of a longest length of the threaded shaft.

2. The beam trolley of claim 1, wherein the first alignment surface comprises a flat portion.

3. The beam trolley of claim 1, wherein the surface of the aligner comprises a flat surface.

4. The beam trolley of claim 1, further comprising a second threaded hand wheel coupled with the threaded shaft and configured to move the threaded shaft relative to one of the first side plate and the second side plate in response to manual rotation of the second threaded hand wheel to adjust the distance between the first side plate and the second side plate.

5. The beam trolley of claim 1, wherein the threaded shaft comprises a second alignment surface and wherein the beam trolley further comprises a second aligner coupled with one of the first side plate and the second side plate, the second aligner comprising a surface engaging the second alignment surface and configured to prevent rotation of the main load bar.

6. The beam trolley of claim 1, wherein the threaded shaft further comprises a flat portion recessed from the first alignment surface.

7. The beam trolley of claim 1, further comprising a locking mechanism configured to prevent rotation of the threaded hand wheel.

8. The beam trolley of claim 1, further comprising a load bail coupled with the threaded shaft.

9. The beam trolley of claim 1, wherein the threaded shaft comprises one or more center holes configured to receive one or more centering elements to keep a load bail in a centered position relative to the threaded shaft.

10. The beam trolley of claim 1, wherein the beam trolley is configured to allow each of the side plates to independently move relative to a center of the main load bar without the other side plate moving relative to the center of the main load bar while the beam trolley is secured to the beam.

11. The beam trolley of claim 1, wherein the beam trolley is configured to allow each of the side plates to move relative to one another without rotating the threaded shaft while the beam trolley is secured to the beam.

12. A beam trolley having a width adjustment system, comprising:
   a first side plate having two or more wheels coupled thereon configured to couple with a beam;
   a second side plate having two or more wheels coupled thereon configured to couple with the beam;
   a main load bar coupled with the first side plate and the second side plate and comprising a threaded shaft having a first flat portion;
   a first threaded hand wheel coupled with the threaded shaft and configured to move the threaded shaft relative to one of the first side plate and the second side plate in response to manual rotation of the first threaded hand wheel to adjust a distance between the first side plate and the second side plate;
   a locking mechanism coupled with the first threaded hand wheel and configured to prevent rotation of the first threaded hand wheel in an engaged configuration and to allow rotation of the first threaded hand wheel in a disengaged configuration, and;
   an aligner coupled with one of the first side plate and the second side plate, the aligner comprising a flat surface engaging the first flat portion and configured to prevent rotation of the main load bar;
   wherein the first flat portion extends along a majority of a longest length of the threaded shaft.

13. The beam trolley of claim 12, further comprising a second threaded hand wheel coupled with the threaded shaft and configured to move the threaded shaft relative to one of the first side plate and the second side plate in response to manual rotation of the second threaded hand wheel to adjust the distance between the first side plate and the second side plate.

14. The beam trolley of claim 12, wherein the threaded shaft comprises a second flat portion and wherein the beam trolley further comprises a second aligner comprising a second flat surface engaging the second flat portion and configured to prevent rotation of the main load bar.

15. The beam trolley of claim 12, wherein the locking mechanism comprises a locking pin coupled into the first threaded hand wheel and one or more pin holes in the first side plate configured to receive the locking pin.

16. The beam trolley of claim 12, wherein the locking mechanism comprises a ratcheting mechanism comprising one or more pawls configured to engage with one or more gear teeth coupled with the first threaded hand wheel.

17. A beam trolley having a width adjustment system, comprising:
   a first side plate having two or more wheels coupled thereon configured to couple with a beam;
   a second side plate having two or more wheels coupled thereon configured to couple with the beam;
   a main load bar coupled with the first side plate and the second side plate and comprising a threaded shaft comprising a first flat portion and a second flat portion;
   a first threaded hand wheel coupled with the threaded shaft and configured to move the threaded shaft relative to the first side plate in response to manual rotation of the first threaded hand wheel to adjust a distance between the first side plate and the second side plate;
   a second threaded hand wheel coupled with the threaded shaft and configured to move the threaded shaft relative to the second side plate in response to manual rotation of the second threaded hand wheel to adjust the distance between the first side plate and the second side plate;

a locking pin coupled with, and configured to prevent rotation of, one of the threaded hand wheels;

a first aligner coupled with the first side plate, the first aligner comprising a flat surface engaging the first flat portion of the threaded shaft and configured to prevent rotation of the main load bar, and;

a second aligner coupled with the second side plate, the second aligner comprising a flat surface engaging the second flat portion of the threaded shaft and configured to prevent rotation of the main load bar.

18. The beam trolley of claim 17, wherein the locking pin is configured to prevent rotation of one of the threaded hand wheels when the locking pin is engaged with a pin hole in one of the side plates and wherein the locking pin is configured to allow rotation of one of the threaded hand wheels when the locking pin is not engaged with the pin hole.

* * * * *